Sept. 1, 1936.  F. W. BROWN  2,053,179
WHEEL RAIL CLAMP
Filed July 18, 1935
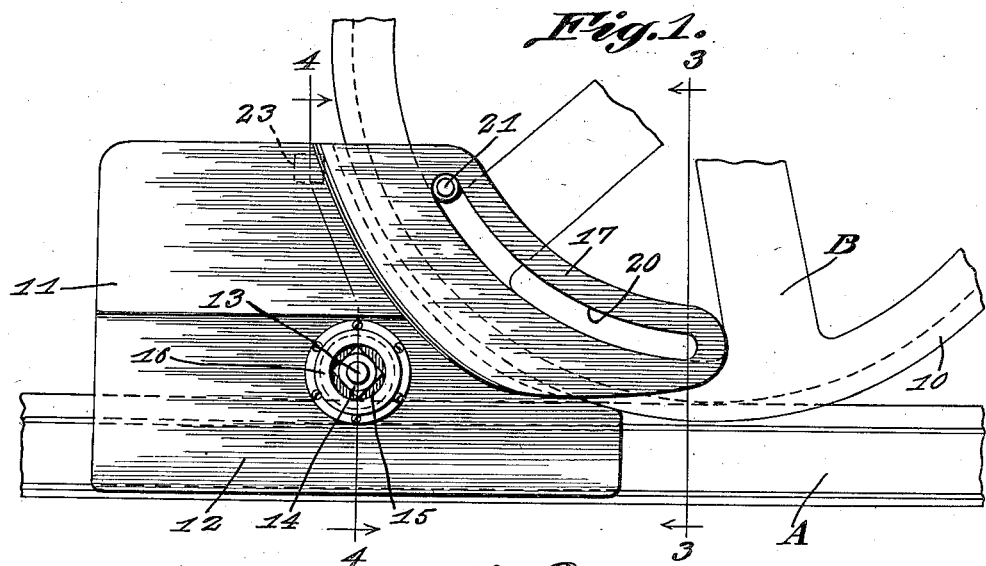
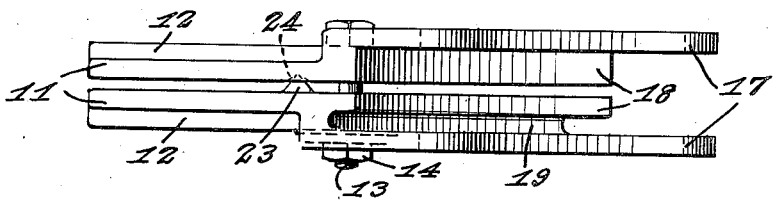
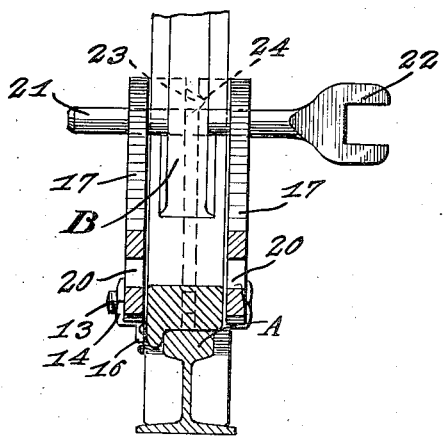
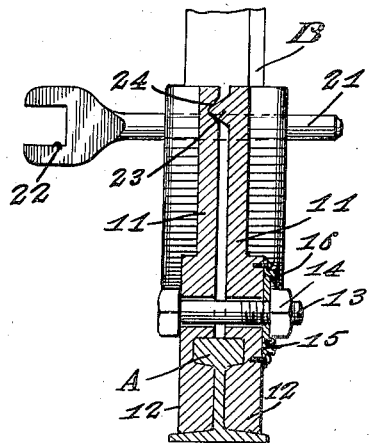
Frank W. Brown, INVENTOR
BY Victor J. Evans & Co.
ATTORNEY Patented Sept. 1, 1936

2,053,179

UNITED STATES PATENT OFFICE 2,053,179

WHEEL RAIL CLAMP

Frank W. Brown, Elkridge, W. Va.

Application July 18, 1935, Serial No. 32,115

2 Claims. (Cl. 104—258)

The invention relates to a car stop and more especially to a wheel rail clamp.

The primary object of the invention is the provision of a clamp of this character, wherein the same when engaged with a track rail will constitute a wheel stop and such wheel can be seated therein and locked therewith so as to avoid the moving of a car especially where the car is not standing on the level. The said car can not become loose when locked to the rail.

Another object of the invention is the provision of a clamp of this character, wherein the construction thereof is novel in form and is readily and easily engaged with a track rail and also the engagement of the wheel of a car therein with dispatch for the locking of the wheel to prevent movement of the car.

A further object of the invention is the provision of a clamp of this character, which is simple in construction, thoroughly reliable and efficient in its operation, readily and easily applied to and removed from a track rail, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary side elevation of a track rail and car wheel showing the clamp constructed in accordance with the invention applied.

Figure 2 is a top plan view of the clamp removed from the rail.

Figure 3 is a fragmentary sectional view on the line 3—3 of Figure 1 looking in the direction of the arrows.

Figure 4 is a sectional view on the line 4—4 of Figure 1 looking in the direction of the arrows.

Figure 5 is a plan view of a locking pin.

Similar reference characters indicate corresponding parts throughout the several views in the drawing.

Referring to the drawing in detail, A designates generally a portion of a track rail and B a portion of a car wheel, respectively, the latter having at its periphery the tread flange 10 to hold the wheel upon the rail and against lateral displacement, the rail and the wheel being of conventional form.

The clamp or car stop comprises a pair of side cheeks or plates 11, which at their lower straight edges are provided with rail engaging jaws 12 which are shaped at the inner faces thereof to conform to the web and ball of the rail A so as to clamp the same when between the jaws 12 and to closely interfit therewith. These cheeks or plates 11 have passed transversely therethrough a securing bolt 13 carrying a nut 14 which plays against a washer 15 held in fixed position by a retaining ring 16 made fast to one of the cheeks 11.

These cheeks or plates 11 are formed with laterally offset arcuate shaped wings 17 and therebetween are arcuate shaped shoulders 18 forming seats for the rim or tread of the wheel B, one of the shoulders 18 being provided with a channel or groove 19 matching and receiving the tread flange 10 of the said wheel B.

Provided in the wings 17 are the arcuate shaped slots 20 for accommodating a releasable locking pin 21 which is passed transversely through the slots 20 to engage between the spokes of the wheel B when the tread or rim is seated against the shoulders 18 between the wings 17 of the cheeks or plates 11 so that the wheel will be clamped to the rail A to hold a car immovable.

The locking pin 21 at one end is formed with a wrench head 22 for convenience for enabling the pin to be utilized as a wrench for the bolt and nut 13 and 14.

On one of the cheeks or plates 11 is a fulcrum lug 23 it engaging a notch 24 companion thereto in the other cheek or plate 11 and this lug when seated in the notch 24 maintains the cheeks or plates spaced apart from each other corresponding to the thickness of the web of the rail A and also assures a uniform spacing of the wings 17 from each other to permit the wheel to roll into the space between the wings for seating against the shoulders 18 so that the pin can be engaged in the slots 20 and lie crosswise between the spokes of the wheel B and thus lock the wheel to the rail and this clamp functions as a car stop and also a wheel rail clamp.

What is claimed is:

1. A clamp of the character described comprising a pair of cheek plates having jaws for engaging a track rail, laterally offset wings on the cheek plates and providing a seat therebetween for a car wheel, means for securing the cheek plates in clamped relation to the rail and means for locking the wheel seated between the wings on said cheek plates, the wings being provided with arcuate shaped slots accommodating the locking means for the wheel.

2. A clamp of the character described comprising a pair of cheek plates having jaws for engaging a track rail, laterally offset wings on the cheek plates and providing a seat therebetween for a car wheel, means for securing the cheek plates in clamped relation to the rail, means for locking the wheel seated between the wings on said cheek plates, the wings being provided with arcuate shaped slots accommodating the locking means for the wheel and a fulcrum lug on one cheek plate and engaged with the other for holding the same spaced relative to each other when secured to the rail.

FRANK W. BROWN.